(12) United States Patent
Gagliano

(10) Patent No.: US 11,983,510 B2
(45) Date of Patent: *May 14, 2024

(54) EVALUATING A MATHEMATICAL FUNCTION IN A COMPUTATIONAL ENVIRONMENT

(71) Applicant: Imagination Technologies Limited, Kings Langley (GB)

(72) Inventor: Luca Gagliano, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 203 days.

This patent is subject to a terminal disclaimer.

(21) Appl. No.: 17/522,063

(22) Filed: Nov. 9, 2021

(65) Prior Publication Data

US 2022/0066738 A1    Mar. 3, 2022

Related U.S. Application Data

(63) Continuation of application No. 16/376,859, filed on Apr. 5, 2019, now Pat. No. 11,169,781.

(30) Foreign Application Priority Data

Apr. 5, 2018    (GB) ..................... 1805684

(51) Int. Cl.
*G06F 7/548*        (2006.01)
*G06F 7/544*        (2006.01)
(Continued)

(52) U.S. Cl.
CPC ............ *G06F 7/548* (2013.01); *G06F 7/5446* (2013.01); *G06F 17/14* (2013.01); *G06F 17/17* (2013.01)

(58) Field of Classification Search
CPC ...................................................... G06F 7/548
See application file for complete search history.

(56) References Cited

U.S. PATENT DOCUMENTS

2006/0059215 A1    3/2006    Maharatna et al.
2008/0012599 A1    1/2008    Hayes
(Continued)

FOREIGN PATENT DOCUMENTS

WO        2005/116862 A2        12/2005

OTHER PUBLICATIONS

Ahmed et al; "Efficient Elementary Function Generation with Multipliers"; Computer Arithmetic, 1989; Proceedings of 9th Symposium on Santa Monica, CA; IEEE Comput. Soc. PR, US; Sep. 6, 1989; pp. 52-59.

(Continued)

*Primary Examiner* — Michael D. Yaary
(74) *Attorney, Agent, or Firm* — Potomac Law Group, PLLC; Vincent M DeLuca

(57) ABSTRACT

Apparatus for evaluating a mathematical function for a received input value includes a polynomial block configured to identify a domain interval containing the received input value over which the mathematical function can be evaluated, the mathematical function over the identified interval being approximated by a polynomial function; and evaluate the polynomial function for the received input value using a set of one or more stored values representing the polynomial function over the identified interval to calculate a first evaluation of the mathematical function for the received input value; and a CORDIC block for performing a CORDIC algorithm, configured to initialise the CORDIC algorithm using the first evaluation of the mathematical function for the received input value calculated by the polynomial block; and implement the CORDIC algorithm to (Continued)

calculate a refined evaluation of the mathematical function for the received input value.

20 Claims, 6 Drawing Sheets

(51) Int. Cl.
*G06F 17/14* (2006.01)
*G06F 17/17* (2006.01)

(56) References Cited

U.S. PATENT DOCUMENTS

| | | |
|---|---|---|
| 2010/0106761 A1 | 4/2010 | Brunelli et al. |
| 2016/0034421 A1* | 2/2016 | Magesacher ........ H04L 27/3427 703/2 |

OTHER PUBLICATIONS

Bajard et al; "Fast evaluation of elementary functions with combined shift-and-add and polynomial methods"; Fourth Conference on Real Numbers and Computers, Apr. 2000, Schloss Dagstuhl, Saarland, Germany; Retrieved from the Internet: URL: https://www-almasty.lip6.fr/~bajard/MesPublis/RNC4.pdf; pp. 1-13.
(*Note: copies of NPL in parent apn).

* cited by examiner

EVALUATING A MATHEMATICAL FUNCTION IN A COMPUTATIONAL ENVIRONMENT

CROSS-REFERENCE TO RELATED APPLICATIONS AND CLAIM OF PRIORITY

This application is a continuation under 35 U.S.C. 120 of copending application Ser. No. 16/376,859 filed Apr. 5, 2019 (now U.S. Pat. No. 11,169,781), which claims foreign priority under 35 U.S.C. 119 from United Kingdom Application No. 1805684.6 filed Apr. 5, 2018.

FIELD

This invention relates to an apparatus and method for evaluating a mathematical function in a computational environment.

BACKGROUND

Within a computational environment, it is often necessary to compute certain mathematical functions for given input values, e.g. floating point or fixed point numbers. Such computations may for example be carried out within a CPU, or GPU, e.g. by a floating point unit or fixed point unit. Examples of some mathematical functions that are typically computed include $f(x)=1/x$; $f(x)=1/\sqrt{x}$; $f(x)=\ln(x)$; $f(x)=2^x$, and trigonometric functions such as $f(x)=\sin(x)$ and $f(x)=\cos(x)$, etc. Such mathematical functions may form part of an instruction set within a processing unit, or form part of an instruction set of a graphics API, such as Direct X.

One approach to evaluating such mathematical functions is to approximate the function with a polynomial, and then evaluate the polynomial for the given input value. For example, a suitable approximating polynomial may be derived through use of a power series. A power series can be used to approximate a function $f(x)$ by expanding the function about a known point $x=a$ as:

$$f(x) = f(a) + f'(a)(x-a) + \frac{f''(a)}{2!}(x-a)^2 + \frac{f^{(3)}}{3!}(x-a)^3 + \ldots \quad (1)$$

An approximating polynomial can then be determined by taking the first n terms of the expansion. For example, by taking the first three terms of the expansion shown in equation (1), an approximating polynomial $p(x)$ to the function $f(x)$ can be written as:

$$p(x)=A+Bx+Cx^2 \quad (2)$$

where $$A = f(a) - af'(a) + \frac{a^2 f''(a)}{2}; B = (f'(a) - af''(a)); C = \frac{f''(a)}{2}.$$

The values of A, B and C could be precomputed and stored as constants. The polynomial given in equation (2) could then be evaluated for a given input value x to approximate the function $f(x)$.

One problem with this approach is that by approximating the function $f(x)$ over its entire domain with a single polynomial, it can be difficult to obtain accurate approximations to the function $f(x)$ for input values of x that stray further from the known point $x=a$.

One approach to address this potential drawback is to divide the domain of the function $f(x)$ into a plurality of intervals i. The function $f(x)$ within each interval i can then be approximated by a respective polynomial $p_i(x)$. This is illustrated schematically in FIG. 1, which shows a function $f(x)$ (illustrated by the solid line in FIG. 1) having a domain split into a plurality of intervals, denoted generally at 104. In this example, the domain of the function is divided into eight intervals, but it will be appreciated that this is merely for illustration and that in general the domain of the function may be divided into any suitable number of intervals. For a convenient implementation within a computational environment, the domain may be divided into $2^N$ intervals, where N is a non-negative integer.

The function is approximated within each interval i by a corresponding polynomial $p_i(x)$. The set of (e.g. $2^N$) polynomials then approximate the function $f(x)$ over its domain. The set of approximating polynomials are collectively illustrated in FIG. 1 by the dashed line 102. Each approximating polynomial $p_i(x)$ may be evaluated for a given input value x using a set of one or more stored values. The set of stored values for each interval may be, for example, one or more coefficients of a polynomial equation.

To evaluate the function $f(x)$ for a given input value x, the input value is used to first identify the domain interval i in which the value is located. The set of one or more stored values representing the polynomial $p_i(x)$ within the identified interval i can then be accessed to evaluate the approximating polynomial $p_i(x)$ for the input value x. The value of this evaluated polynomial may then serve as the approximation to the function $f(x)$.

SUMMARY

According to the present invention there is provided an apparatus for evaluating a mathematical function for a received input value, the apparatus comprising:
  a polynomial block configured to:
    identify a domain interval containing the received input value over which the mathematical function can be evaluated, the mathematical function over the identified interval being approximated by a polynomial function; and
    evaluate the polynomial function for the received input value using a set of one or more stored values representing the polynomial function over the identified interval to calculate a first evaluation of the mathematical function for the received input value; and
  a CORDIC block for performing a CORDIC algorithm, configured to:
    initialise the CORDIC algorithm using the first evaluation of the mathematical function for the received input value calculated by the polynomial block; and
    implement the CORDIC algorithm to calculate a refined evaluation of the mathematical function for the received input value.

The mathematical function may be approximated over each of a plurality of domain intervals by a respective polynomial function.

Each of the polynomial functions may be represented by a set of one or more stored values.

The polynomial function may be represented over the identified domain interval by a set of one or more control points, and the polynomial block may be configured to evaluate the polynomial function for the received input value using the set of one or more control points.

The mathematical function may be approximated over a plurality of domain intervals by a piecewise polynomial function represented by a plurality of stored control points, the mathematical function being approximated over each interval by a corresponding polynomial function.

The piecewise polynomial function may be a uniform spline function, and the control points may be B-spline control points.

The control points may be stored in at least one look-up table accessible by the polynomial block.

The at least one look-up table may include a total of M+n entries each storing a single control point, where M is the number of domain intervals over which the mathematical function is approximated; and n is the order of the polynomial functions approximating the mathematical function over the intervals.

Each of the polynomial functions may be represented by a respective set of one or more polynomial coefficients.

The polynomial coefficients representing the polynomials for the domain intervals may be stored in at least one look-up table accessible by the polynomial block.

The at least one look-up table may include a total of $M \cdot (n+1)$ entries each storing a single coefficient, where M is the number of domain intervals over which the mathematical function is approximated; and n is the order of the polynomial functions approximating the mathematical function over the intervals.

The CORDIC block may be configured to implement the CORDIC algorithm by performing a plurality of iterative calculations to calculate the refined evaluation of the mathematical function $f(x)$ for the received input value x.

The CORDIC block may be configured to perform each iterative calculation to calculate a refined evaluation to the mathematical function $f(t_k)$ from a previous evaluation $f(t_{k-1})$, where $t_k = \Sigma_{j=0}^{k} d_j w_j$, $d_j \in D_p$ and $D_p$ is a stored digit set, and $w_j$ are stored constants so that $t_k \to x$ as $k \to \infty$.

The CORDIC block may be configured to calculate $t_k = t_{k-1} + d_{k-1} w_{k-1}$.

The CORDIC block may be configured to calculate $t_k = t_{k-1} w_{k-1}^{d_{k-1}}$.

The CORDIC block may be configured to initialise the CORDIC algorithm with a first evaluation of the mathematical function $f(t_{k-1})$ determined by the polynomial calculation block by evaluating the polynomial function for the received input value x.

The CORDIC block may be configured to perform the first iterative calculation using the first evaluation of the mathematical function determined by the polynomial block by evaluating the polynomial function for the received input value.

The CORDIC block may be configured to implement the CORDIC algorithm until the difference between refined evaluations from successive iterative calculations is less than a specified value.

There may be provided a computer-implemented method of evaluating a mathematical function for a received input value, the method comprising:
  identifying a domain interval containing the received input value over which the mathematical function can be evaluated, the mathematical function over the identified interval being approximated by a polynomial function;
  evaluating the polynomial function for the received input value using a set of one or more stored values representing the polynomial function over the identified interval to calculate a first evaluation of the mathematical function for the received input value;
  initialising a CORDIC algorithm using the first evaluation of the mathematical function for the received input value; and
  implementing the CORDIC algorithm to calculate a refined evaluation of the mathematical function for the received input value.

The mathematical function may be approximated over each of a plurality of domain intervals by a respective polynomial function.

Each of the polynomial functions may be represented by a set of one or more stored values.

The polynomial function may be represented over the identified domain interval by a set of one or more control points, and the method may comprise evaluating the polynomial function for the received input value using the set of one or more control points.

The mathematical function may be approximated over the plurality of intervals by a piecewise polynomial function represented by a plurality of control points, the mathematical function being approximated over each domain interval by a corresponding polynomial function.

The piecewise polynomial function may be a uniform spline function, and the control points may be B-spline control points.

The control points may be stored in at least one look-up table.

The at least one look-up table may include a total of M+n entries each storing a single control point, where M is the number of domain intervals over which the mathematical function is approximated; and n is the order of the polynomial functions approximating the mathematical function over the intervals.

Each of the polynomial functions may be represented by a respective set of one or more polynomial coefficients.

The polynomial coefficients representing the polynomials for the intervals may be stored in at least one look-up table.

The at least one look-up table may include a total of $M \cdot (n+1)$ entries each storing a single coefficient, where M is the number of domain intervals over which the mathematical function is approximated; and n is the order of the polynomial functions approximating the mathematical function over the intervals.

The step of implementing the CORDIC algorithm may comprise performing a plurality of iterative calculations to calculate the refined evaluation of the mathematical function $f(x)$ for the received input value (x).

Each iterative calculation may calculate an approximation to the mathematical function $f(t_k)$ from a previous approximation $f(t_{k-1})$, where $t_k = \Sigma_{j=0}^{k} d_j w_j$, $d_j \in D_p$ and $D_p$ is a stored digit set and $w_j$ are stored constants so that $t_k \to x$ as $k \to \infty$.

Each iterative calculation may comprise calculating $t_k = t_{k-1} + d_{k-1} w_{k-1}$.

Each iterative calculation may comprise calculating $t_k = t_{k-1} w_{k-1}^{d_{k-1}}$.

The CORDIC algorithm may be initialised with a first evaluation of the mathematical function $f(t_{k-1})$ determined by evaluating the polynomial function for the received input value x.

The first iterative calculation may be performed using the first evaluation of the mathematical function determined by evaluating the polynomial function for the received input value.

The CORDIC algorithm may be implemented until the difference between refined approximations from successive iterative calculations is less than a specified value.

The apparatus of any of the examples above may be embodied in hardware on an integrated circuit.

There may be provided a method of manufacturing, using an integrated circuit manufacturing system, an apparatus according to any of the examples above.

There may be provided an integrated circuit definition dataset that, when processed in an integrated circuit manufacturing system, configures the system to manufacture an apparatus according to any of the examples above.

There may be provided a non-transitory computer readable storage medium having stored thereon a computer readable description of an integrated circuit that, when processed in an integrated circuit manufacturing system, causes the integrated circuit manufacturing system to manufacture an apparatus according to any of the examples above.

There may be provided an integrated circuit manufacturing system configured to manufacture an apparatus according to any of the examples above.

There may be provided an integrated circuit manufacturing system comprising:
- a non-transitory computer readable storage medium having stored thereon a computer readable integrated circuit description that describes an apparatus according to any of the examples above;
- a layout processing system configured to process the integrated circuit description so as to generate a circuit layout description of an integrated circuit embodying the apparatus; and
- an integrated circuit generation system configured to manufacture the apparatus according to the circuit layout description.

There may be provided an apparatus configured to perform the method according to any of the examples above.

There may be provided a computer program code for performing a method according to any of the examples above.

There may be provided a non-transitory computer readable storage medium having stored thereon computer readable instructions that, when executed at a computer system, cause the computer system to perform a method according to any of the examples above.

BRIEF DESCRIPTION OF FIGURES

The present invention will now be described by way of example with reference to the accompanying drawings. In the drawings.

DETAILED DESCRIPTION

Figure 1:
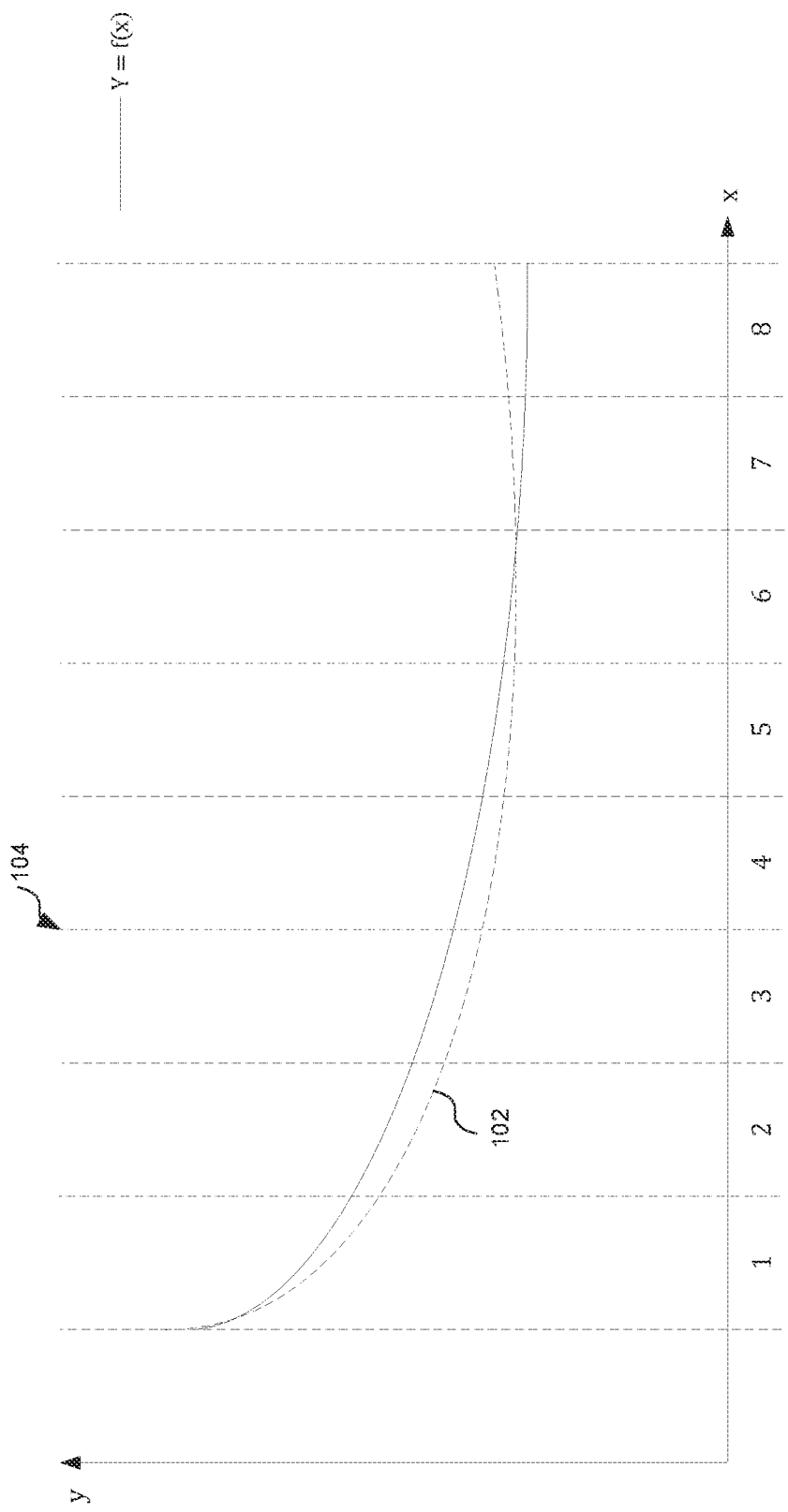
FIG. 1 shows a schematic illustration of a mathematical function $f(x)$ being approximated over its domain by a set of polynomials $p_i(x)$.

The present disclosure is directed to an apparatus and method for evaluating a mathematical function $f(x)$ within a computational environment, for example within a floating point or fixed point unit within a processor such as a CPU or GPU.

The domain of the function $f(x)$ is split, or partitioned, into a plurality of domain intervals i. Each domain interval may be of equal width but this is not a requirement. The number, M, of domain intervals i may be implementation specific, but in some examples may be equal to $2^N$, where N is a non-negative integer; i.e. N≥0 (thus in some examples, the domain is formed of a single interval). The function $f(x)$ may be approximated within each domain interval i by a corresponding polynomial function $p_i(x)$. Thus, there may be a set of M polynomials that approximate the function over its domain; i.e. the set of polynomials $p_i(x)$ for the plurality of domain intervals approximate the function $f(x)$ over its domain. The polynomials may be of any order, e.g. linear, quadratic, cubic or higher order. The approximating polynomials for the domain intervals may be of the same order. Each polynomial $p_i(x)$ may be represented by a corresponding set of one or more data values. Each set of one or more values could be, for example, coefficients of a polynomial equation. Alternatively, each set of one or more values may be control points (e.g. B-spline control points) of a piecewise polynomial function. The values may be pre-determined (e.g. pre-computed) and stored, for example in memory.

For a received input value x'∈x, the domain interval i containing the input value is identified. The corresponding polynomial function $p_i(x)$ approximating the mathematical function $f(x)$ within that domain interval is then evaluated at x' using the set of one or more stored values representing the polynomial over that interval. The evaluation of the polynomial function $p_i(x)$ calculates an approximation to the mathematical function at the value x', denoted $f_{approx}(x')$.

The approximated function $f_{approx}(x')$ is then refined using a CORDIC algorithm. More specifically, the approximated function is used to initialise the CORDIC algorithm. Once initialised, the CORDIC algorithm is implemented to iteratively refine the approximation to the mathematical function $f(x)$ for the input value x'.

It has been appreciated that by refining the approximation to the mathematical function using a CORDIC algorithm, the data storage requirements of the values representing the approximating polynomials may be reduced compared to conventional approaches to evaluating mathematical functions in which the evaluated polynomial is taken as the final approximation to the mathematical function $f(x)$. This is because, due to the subsequent refinement step, the accuracy of the approximation provided by evaluating the polynomial can be reduced compared to the conventional approaches. Moreover, by initialising the CORDIC algorithm using the values of the evaluated polynomials, the time required for the CORDIC algorithm to converge to a sufficiently accurate result may be reduced compared to solely implementing a CORDIC algorithm to evaluate the function $f(x)$ directly.

Examples of a method and apparatus for evaluating the mathematical function will now be described in more detail.

Figure 2:
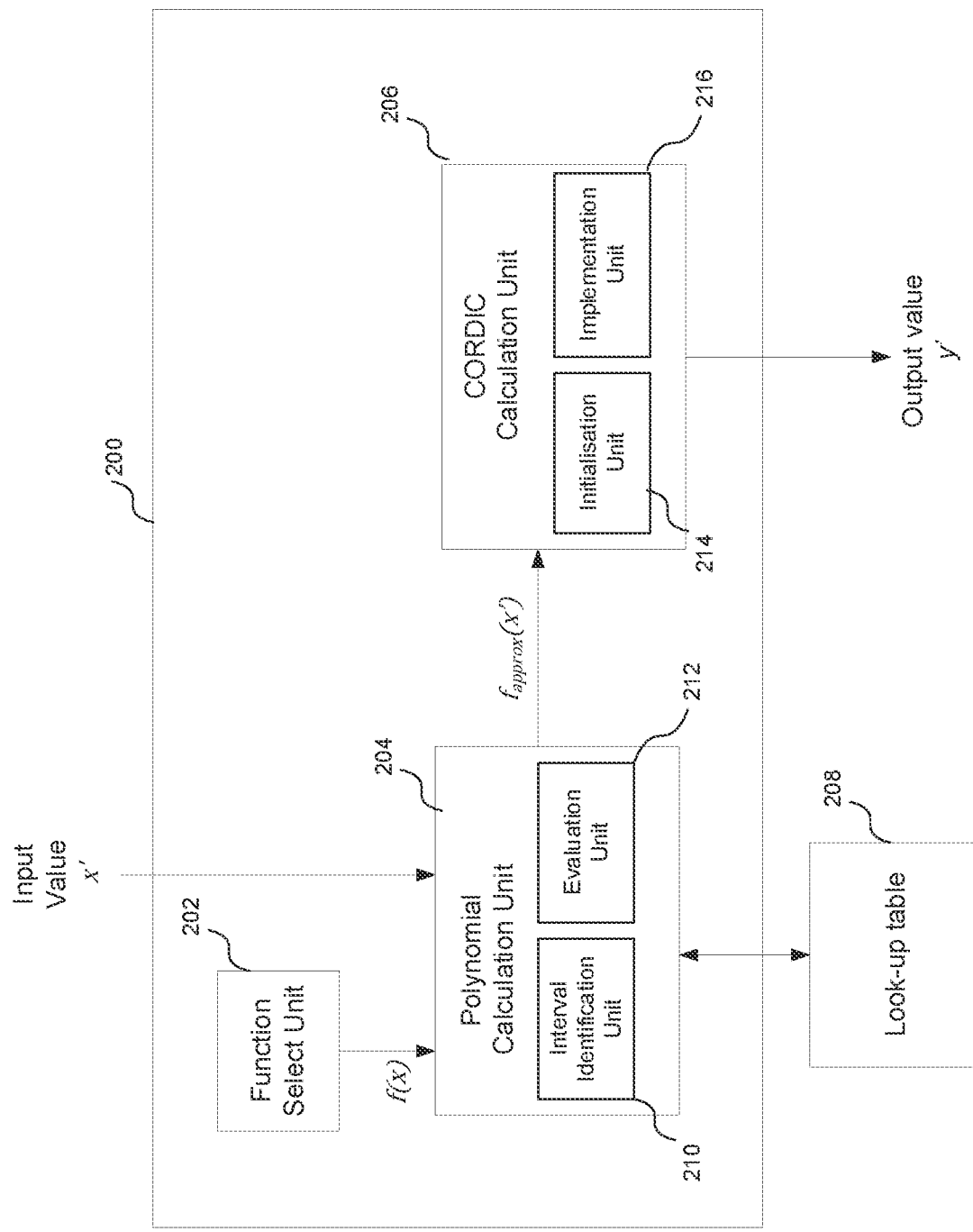
FIG. 2 shows an example apparatus for evaluating a mathematical function $f(x)$ within a computational environment.

FIG. 2 shows an apparatus 200 configured to evaluate a function $f(x)$ for a received input value x'. The input value may be a floating point number, or a fixed point number. In this example, apparatus 200 is capable of evaluating one of a predetermined set of one or more functions for a given received input value. The apparatus 200 comprises a function select unit 202 that is configured to select the function $f(x)$ to evaluate from a set of one or more functions. The set of one or more functions may be a predetermined set of functions. The set of functions that may be evaluated by apparatus 200 may include one or more of, for example: reciprocal functions, reciprocal square root functions, logarithmic functions (e.g. logarithm base 2 functions such as $\log_2(x)$), power functions (e.g. power base 2 functions such as $2^x$) and trigonometric functions, e.g. $\sin(x)$ and $\cos(x)$. In other examples, apparatus 200 may be adapted to evaluate only a single function. In this case, the apparatus may not comprise a function select unit.

The apparatus additionally comprises a polynomial calculation unit 204, coupled to the function select unit 202, and a CORDIC calculation unit 206, coupled to the polynomial calculation unit 204. The polynomial calculation unit 204 is also coupled to a look-up table (LUT) 208. Look-up table 208 is shown in this example as being external to the apparatus 200. LUT 208 may for example be stored in an external memory, e.g. a system memory. In other examples, LUT 208 may be stored in a local memory, such as a cache, which may in other implementations form part of the apparatus 200.

Apparatus 200 operates to evaluate a function $f(x)$ at a received input value x' to generate an output value $y \approx f(x')$. As indicated above, the domain of the function $f(x)$ is partitioned into a plurality of domain intervals i. The number of domain intervals into which the domain is partitioned may be denoted M. In some examples, $M=2^N$, where N is a non-negative integer. The function is approximated over each interval i by a corresponding polynomial function $p_i(x)$. Thus, the function $f(x)$ may be approximated over its domain by a set of M polynomial functions; i.e. the set of M polynomial functions collectively approximate the function $f(x)$ over its domain.

Figure 3:
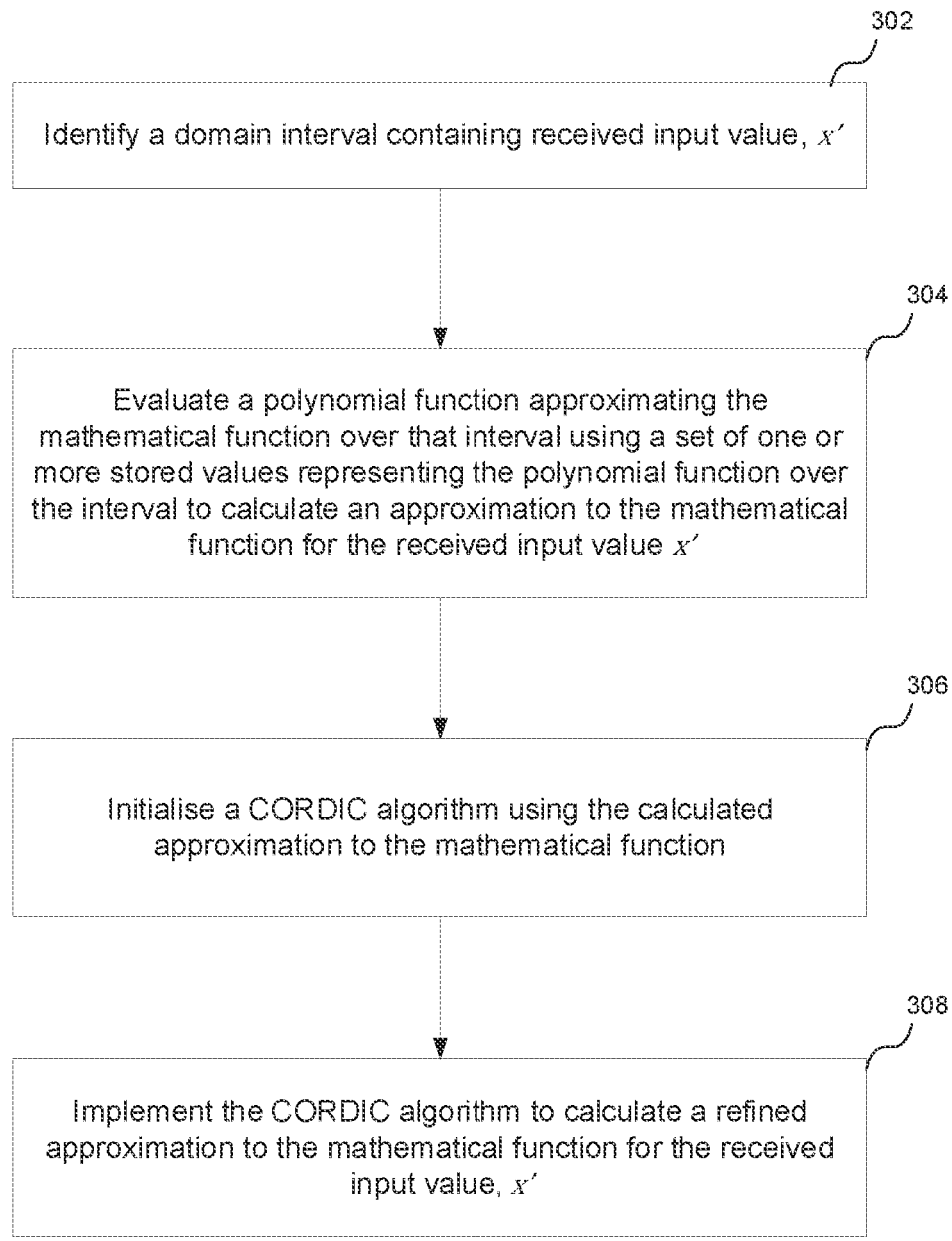
FIG. 3 shows a flowchart of steps of a method for evaluating a mathematical function $f(x)$ within a computational environment.

The operation of apparatus 200 will now be described with reference to the flowchart shown in FIG. 3.

The polynomial calculation unit 204 receives the input value x' and the desired function to be evaluated, $f(x)$ from the function select unit 202.

At step 302, the polynomial calculation unit operates to identify the domain interval i containing the input value x'. This step may be performed by the interval identification unit 210 of the polynomial calculation unit 204. The interval identification unit may for example store or otherwise have access to a set of bounding values for each of the domain intervals. The interval identification unit may then compare the received input value x' against these bounding values to identify the domain interval having bounding values defining a range that includes the input value. That domain interval may then be identified as the interval containing the received input value x'. The identified interval i may be communicated to the evaluation unit 212.

At step 304, the polynomial calculation unit 204 evaluates the polynomial function $p_i(x)$ that approximates the function $f(x)$ over the identified domain interval i that contains the input value x'. The polynomial is evaluated for the input value x'. The polynomial is evaluated using a set of one or more stored values that represent the polynomial over the interval i. Step 304 may be performed by the evaluation unit 212.

The polynomial function $p_i(x)$ may be represented by a set of one or more values in various ways. In one set of examples, each polynomial function is represented by a set of K coefficients. The value of K depends on the order of the polynomial. For example, for a linear polynomial of the form Ax+B, K=2. For a quadratic polynomial, K=3; for a cubic polynomial, K=4 etc. In general, the value of K=n+1, where n is the order of the polynomial. The coefficients for each domain interval may be stored in the look-up table 208. For a domain split into M intervals, the look-up-table may contain K·M entries, where each entry contains a coefficient value and K coefficients are needed to evaluate the polynomial $p_i(x)$ for interval i.

The evaluation unit 212 may access the LUT 208 to retrieve the K coefficient values that represent polynomial $p_i(x)$ for the identified interval i containing the input value x'. The evaluation unit 212 may then evaluate the polynomial $p_i(x)$ using the retrieved coefficient values and the input value x'.

In another example, the set of one or more values representing the polynomial function $p_i(x)$ could be one or more control points that can be used to define the polynomial function. In this case, the function $f(x)$ may be approximated over the domain by a spline. The spline could be, for example, an approximating spline (e.g. a B-spline represented by B-spline control points), or an interpolating spline (e.g. a Catmull-Rom spline). An approximating spline is a spline that is constrained by the control points but may not intersect the control points. An approximating spline may pass around the control points. An intersecting spline is a spline that passes through each control point. The spline could be a uniform spline (i.e. a spline defined by uniformly spaced control points). The spline could be of any suitable order, for example a quadratic or a cubic spline. The spline that approximates the function $f(x)$ can be a piecewise polynomial function. The piecewise polynomial function is defined by a set of polynomial functions that approximate the function $f(x)$ over a corresponding domain interval. The order of each polynomial function is equal to the order of the spline (for example, a quadratic spline is formed of quadratic piecewise polynomial functions; a cubic spline is formed of cubic piecewise polynomial functions etc.).

The number of control points needed to represent one of the piecewise polynomials depends on the order of the spline. A spline of order n requires K=n+1 control points to define each piecewise polynomial. Thus, for example, a quadratic spline requires three control points to define each piecewise (quadratic) polynomial; a cubic spline requires four control points to define each piecewise (cubic) polynomial, etc. Compared to the above example where each approximating polynomial is represented by one or more stored coefficients, the use of stored control points to represent the polynomials reduces the amount of data values that need to be stored to represent a polynomial of a given order. In particular, for a function having a domain partitioned into M intervals, M+n (i.e., M+K−1) control points are needed to define the spline of order n that approximates the function over the domain. The K−1 control points are needed to define the piecewise polynomials in the two terminal domain intervals.

Figure 4:
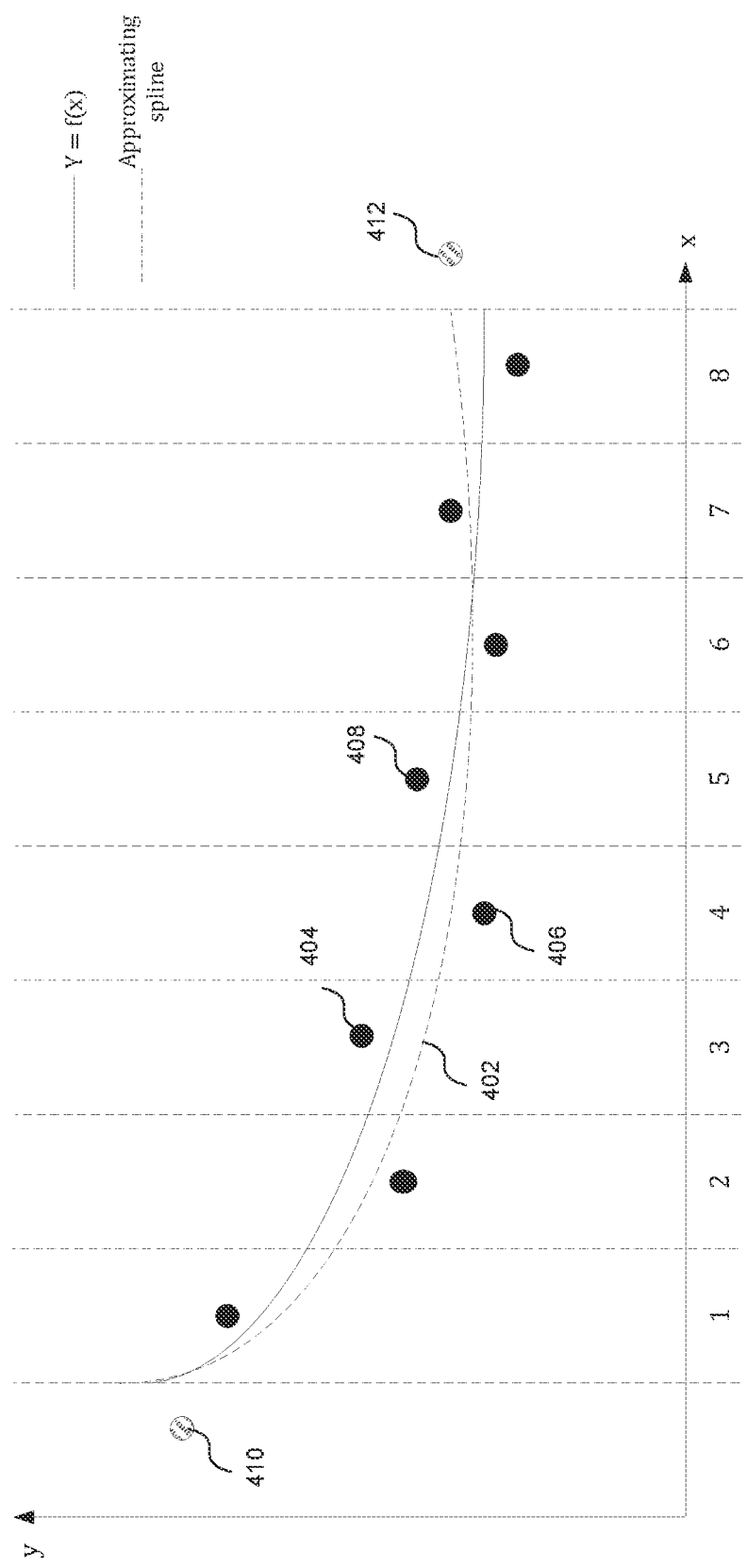
FIG. 4 is a schematic illustration of a spline approximating a mathematical function to be evaluated.

The use of control points to define piecewise polynomials that approximate the function $f(x)$ over a domain of M intervals is illustrated schematically in FIG. 4. In this example illustration, the function $f(x)$ (illustrated with the solid line in FIG. 4) is partitioned into M=8 domain intervals, and the spline that approximates the function over the domain is a quadratic spline (i.e., n=2) formed of M piecewise polynomials. The approximating spline is shown at 402. Each piecewise polynomial in this example is therefore a quadratic polynomial defined by K=n+1=3 control points. Each piecewise polynomial is a polynomial $p_i(x)$ that approximates the function $f(x)$ over a corresponding domain interval i. For example, the piecewise polynomial $p_4(x)$ approximates the function $f(x)$ over domain interval 4 and is defined by the three control points 404, 406 and 408. It can be seen that an additional n=2 control points are needed to define the piecewise polynomials $p_1(x)$ and $p_8(x)$ that approximate the function $f(x)$ over the terminal domain intervals 1 and 8 respectively. These additional control points are denoted 410 and 412. Thus, a set of M+n=10 control points define the set of piecewise polynomials that approximate the function over the domain.

The control points defining the set of piecewise polynomials may be stored in LUT 208. For a domain split into M domain intervals and an approximating spline of order n, the LUT 208 in this case might only contain M+n entries, where each entry contains data for only a single control point. In terms of the amount of data that needs to be stored in the LUT, this compares favourably with the example described above, in which the LUT contained K. M=(n+1)·M data entries.

The evaluation unit 212 may access the LUT 208 to retrieve the K control points that represent polynomial $p_i(x)$ for the identified interval i containing the input value x'. The evaluation unit 212 may then evaluate the polynomial $p_i(x)$ using the retrieved control points and the input value x'.

To evaluate the polynomial $p_i(x)$, the evaluation unit 212 may first derive a set of polynomial coefficients describing the polynomial from the retrieved set of K control points. The evaluation unit 212 may generate the polynomial coefficients from a manipulation of the retrieved set of control points. This may be performed by arithmetic blocks forming part of the evaluation unit 212. Once the polynomial coefficients have been derived from the control points by the evaluation unit, the evaluation unit evaluates the polynomial $p_i(x)$ using the derived coefficients and the input value x'.

More details describing how polynomial coefficients can be derived from a set of stored spline control points, and more generally how a set of piecewise polynomials may be used to evaluate a function $f(x)$, can be found in the applicant's PCT application PCT/GB2005/002118, the disclosure of which is incorporated herein by reference.

In general, the polynomial calculation unit 204 operates to evaluate a polynomial $p_i(x)$ that approximates the function to be evaluated $f(x)$ over an interval i containing the input value x'. In other words, the polynomial $p_i(x)$ is evaluated at the value x'. The value of the evaluated polynomial serves as a first evaluation of the mathematical function $f(x)$ for the input value x'. This first evaluation of the function may be referred to herein as an approximate, or estimated evaluation of the function, and is denoted in FIG. 2 as $f_{approx}(x')$.

The approximate evaluation of the function $f(x)$ calculated by the unit 204 is output to the CORDIC calculation unit 206. The CORDIC calculation unit 206 operates to refine the approximate evaluation of the mathematical function determined by the polynomial calculation unit 204 to output a refined evaluation y'. This is explained below.

In summary, the CORDIC calculation unit 206 performs a CORDIC algorithm to refine the approximate evaluation of the mathematical function $f(x)$ by generating iteratively refined evaluations.

The principle of the CORDIC algorithm is to evaluate a function $f(x)$ at x' by writing x' as a sum:

$$x' = \sum_{j=0}^{\infty} d_j w_j \quad (3)$$

In equation (3), $d_j \in D_p$, where $D_p$ is a stored digit set depending on a natural integer p, and $w_j$ are a set of predetermined (e.g. precomputed) constants. Example elements of the set $D_p$ are:

$$d_j = 0, 1, \ldots p \quad (4)$$

$$d_d = -p, \ldots p \quad (5)$$

Thus, $D_p$ may be a set of p+1 or 2p+1 constants.
Defining:

$$t_k = \sum_{j=0}^{k} d_j w_j \quad (6)$$

the set of constants $w_j$ are predetermined so that an iterative evaluation of the function $f(t_k) = f_k(x)$ can be computed from a previous evaluation $f(t_{k-1})$. The set of constants $w_j$ are also predetermined so that $t_k \to x'$ as $k \to \infty$, meaning that:

$$\lim_{k \to \infty} f(t_k) \to f(x') \quad (7)$$

Such a set of constants $w_j$ that can be used to converge to a real value x' (i.e. a set of constants that satisfy equation (3)) may be referred to as a discrete basis. The constants $w_j$ are referred to as a bidirectional discrete basis of order p if there's a set of integer elements $d_j \in \{-p, \ldots p\}$ that satisfy equation (3). The set of constants $w_j$ are referred to as a unidirectional discrete basis of order p if there's a set of integer elements $d_j \in \{0, \ldots p\}$ that satisfy equation (3).

Some example discrete bases include, for example:
- $w_j = 2^{-j}$, which is a bidirectional discrete basis of order p for all p≥1;
- $w_j = 2^{-j}$, which is a unidirectional discrete basis of order p for all p≥1;
- $w_j = 3^{-j}$, which is a bidirectional discrete basis of order p for all p≥1;
- $w_j = 3^{-j}$, which is a unidirectional discrete basis of order p for all p≥2;
- $w_j = 10^{-j}$, which is a bidirectional discrete basis of order p for all p≥5;
- $w_j = 10^{-j}$, which is a unidirectional discrete basis of order p for all p≥9;

Further examples of a discrete basis are $w_j = \tan^{-1}(2^{-j})$; and $w_j = \tan h^{-1}(2^{-j})$.

Typically, the CORDIC algorithm iteratively calculates $f(t_k)$ from $f(t_{k-1})$ using an initial value $f(t_{k=0}) = f(x_0)$.

Returning now to FIG. 3, and at step 306 the calculation unit 206 initialises the CORDIC algorithm using the first evaluation of the mathematical function $f(x)$ at x' determined by the polynomial calculation unit 204 (i.e. using $f_{approx}(x')$). The calculation unit 206 initialises the CORDIC algorithm by setting an approximation to the mathematical function after k' iterations of the algorithm to be equal to $f_{approx}(x')$. The algorithm is therefore initialised at the $k'^{th}$ iteration. That is, the CORDIC calculation block 206 initialises the CORDIC algorithm with an approximation to the mathematical function $f(t_{k'})$ that is determined by the polynomial calculation block 204 (i.e., the CORDIC calculation block sets the value $f(t_{k'}) = f_{approx}(x')$ for k'>0). The initialisation may be performed by the initialisation unit 214 of the CORDIC calculation unit.

Initialising the CORDIC algorithm with the first evaluation of the mathematical function $f(x)$ at x' effectively enables the CORDIC calculation unit to bypass the first k' iterations of the CORDIC algorithm. In other words, convergence of the CORDIC algorithm to some specified convergence level may occur in k' fewer iterations compared to if the CORDIC algorithm were initialised in the conventional manner using some initial value $f(t_{k=0}) = f(x_0)$. The CORDIC algorithm may be initialised using a value $f(t_{k'})=f_{approx}(x')$ for an argument value $t_{k'}$ that belongs to the convergence interval, or equivalently the interval of convergence. The interval of convergence is the set of values $t_k$ for which the CORDIC algorithm will converge to the value $f(x)$. The value of k' (i.e. the number of iterations of the CORDIC algorithm that are effectively bypassed by initialising the algorithm with the value $f(t'_k)$) may depend on the proximity of the value $t'_k$ to the input value x'. The closer the value $t'_k$ is to the input value x', the fewer the iterations of the CORDIC algorithm may be required to converge to the value $f(x)$ to some convergence level.

The initialised value for the CORDIC algorithm is communicated from the initialisation unit to the implementation unit.

At step 308, the CORDIC calculation unit 206 implements the CORDIC algorithm to calculate a refined evaluation of the mathematical function $f(x)$ at the received input value x'.

That is, at step 308, a plurality of iterations of the CORDIC algorithm are performed to refine the first evaluation of the mathematical function calculated by the polynomial calculation unit 204.

The CORDIC algorithm is implemented by the implementation unit 216. As indicated above, the implementation unit 216 may implement the CORDIC algorithm by performing a plurality of iterative calculations to calculate a sequence of refined evaluations of the mathematical function $f(x)$ for the received input value x'.

The implementation unit 216 may perform each iterative calculation to calculate a refined evaluation of the mathematical function $f(t_k)$ from a previous evaluation $f(t_{k-1})$, where $k \geq k'+1$, $t_k = \sum_{j=0}^{k} d_j w_j$, $d_j \in D_p$ and $D_p$ is a stored digit set accessible by the implementation unit 216, and $w_j$ are a discrete bases, such as one of the discrete bases described above. The value $f(t_k)$ is an estimated value of the mathematical function $f(x)$ evaluated at the received input value x' after k iterations of the CORDIC algorithm. The components of the discrete basis $w_j$ are also stored and are accessible by the implementation unit. The discrete basis could for example be stored in a look-up table (LUT). The LUT may form part of the implementation unit 216. Alternatively, the LUT may be external to the implementation unit but otherwise accessible by the implementation unit.

At each iteration of the algorithm, the implementation unit 216 calculates the refined evaluation of the mathematical function, $f(t_k)$, in dependence on the evaluation of the function from the previous iteration, $f(t_{k-1})$, and the value $d_{k-1}$, which is determined from the argument of the function $t_{k-1}$ at the previous iteration of the algorithm, k–1. The implementation unit 216 may calculate the refined evaluation of the mathematical function, $f(t_k)$, at iteration k of the algorithm by performing the following steps:

(i) selecting a value of $d_{k-1}$ from the set of values $D_p$ using the argument of the function $t_{k-1}$ at the previous iteration of the algorithm, k–1;

(ii) calculating the refined evaluation of the mathematical function $f(t_k)$ from the evaluation $f(t_{k-1})$ at the previous (k–1)$^{th}$ iteration of the algorithm, and the selected value $d_{k-1}$; and optionally (iii) calculating a refined argument of the function $t_k$ from the argument of the function $t_{k-1}$ and the value $d_{k-1}$ for determining the value $d_k$ for use in the next iteration of the algorithm, k+1.

The implementation unit 216 may select the value of $d_{k-1}$ from the set of values $D_p$ for use in iteration k of the algorithm from a comparison of the argument value $t_{k-1}$ from iteration k–1 with the received input value of the function, x'. The value of $d_{k-1}$ selected from the set of values $D_p$ may for example depend on whether the argument value $t_{k-1}$ is greater than or less than the received input value x'.

The implementation unit 216 may calculate a value of the argument of the mathematical function, $t_k$, from a previously calculated argument value $t_{k-1}$ using an additive method. For example, the value $t_k$ may be calculated as:

$$t_k = t_{k-1} d_{k-1} w_{k-1} \qquad (8)$$

Alternatively, the value $t_k$ may be calculated from a previously calculated argument value $t_{k-1}$ using a multiplicative method, such as:

$$t_k = t_{k-1} w_{k-1}^{d_{k-1}} \qquad (9)$$

The value of $t_k$ is used by the implementation unit 216 to identify the value $d_k$ which is used to calculate the refined evaluation of the mathematical function $f(t_{k+1})$ at the next iteration k+1; i.e., the refined evaluation of the mathematical function $f(t_{k+1})$ is calculated from $f(t_k)$ in dependence on the value $d_k$.

The implementation unit 216 may perform a plurality of iterative calculations to refine the evaluation of the mathematical function. The number of iterations performed by the implementation unit 216 may depend on, for example, the desired accuracy of the result and the accuracy of the first evaluation provided by the polynomial calculation unit 204. For example, fewer iterations of the algorithm may need to be performed to obtain a result of a desired accuracy if a relatively more accurate first evaluation is provided by the polynomial calculation unit 204 compared to if a relatively less accurate first evaluation is provided by the polynomial calculation unit 204.

In one example, the implementation unit implements the CORDIC algorithm until the difference in values between successive evaluations of the mathematical function decreases beyond a specified amount (i.e., until the CORDIC algorithm has converged to within a specified accuracy, or to within some convergence level).

A specific example implementation of the CORDIC algorithm performed by the CORDIC calculation unit 206 will now be described. In this example, the CORDIC algorithm is performed to calculate a trigonometric function; i.e. $f(x)$ is a trigonometric function where the argument of the function x is an angle, θ. The input value at which the function is to be evaluated is θ'. The CORDIC calculation unit 206 calculates the trigonometric function by performing successive iterative rotations of a vector $v_k$ starting with an initialised vector $v_{k'} = (x_{k'}, y_{k'})^T$ provided by the polynomial calculation unit 204. As the algorithm converges, the vector $v_k$ is rotated to the input value θ'. The value of the function $f(θ)$ evaluated at the input value θ' can then be estimated from the rotated vector $v_k$.

In this example, the discrete basis $w_j$ is a unidirectional discrete basis of order p=1. Specifically, $w_j = \tan^{-1}(2^{-j})$.

The vector $v_k = (x_k, y_k)^T$ at iteration k of the algorithm has a rotation angle $t_k$. Mathematically, the vector $v_k$ can be calculated from an initial vector $v_{k=0} = v_0$ and a rotation matrix $R_{t_k}$ as:

$$v_k = R_{t_k} v_0 \qquad (10)$$

The vector $v_0$ is the starting vector of the CORDIC algorithm. It is noted that $v_0 \neq v_{k'}$; $v_{k'}$ is the approximating vector provided by the polynomial calculation unit 204 that initialises the CORDIC algorithm after k' iterations, whereas $v_0$ is the starting vector of the CORDIC algorithm; i.e. the vector after zero iterations.

The rotation matrix $R_{t_k}$ (assuming the matrix is a counter-clockwise rotation matrix) is given by:

$$R_{t_k} = \begin{pmatrix} \cos(t_k) & -\sin(t_k) \\ \sin(t_k) & \cos(t_k) \end{pmatrix} \qquad (11)$$

The rotation angle $t_k$ at iteration k of the algorithm may be calculated according to the following iterative scheme:

$$t_k = \begin{cases} 0 & k = 0 \\ t_{k-1} + d_{k-1}w_{k-1} & k \geq 1 \end{cases} \qquad (12)$$

where $t_k \to \theta'$ as $k \to \infty$;
And:

$$d_{k-1} = \begin{cases} 1 & t_{k-1} < \theta' \\ 0 & t_{k-1} \geq \theta' \end{cases} \qquad (13)$$

The CORDIC calculation unit 206 can implement the iterative scheme defined in equations (12) and (13) to identify the value $d_{k-1}$ from the argument value $t_{k-1}$. The value of $d_{k-1}$ can then be used to calculate the function value $f(t_k)$, as will now be explained in more detail.

Equation (10) can be re-written to express the vector $v_k$ at iteration k of the algorithm as:

$$v_k = R_{t_k}v_0 = R_{d_{k-1}w_{k-1}}(R_{t_{k-1}}v_0) = R_{d_{k-1}w_{k-1}}v_{k-1} \qquad (14)$$

For a suitable choice of starting vector (e.g. if $v_0=(1,0)^T$), the iterative scheme given by equation (14) converges to $v=(\cos(\theta'), \sin(\theta'))^T$.

To make this implementation efficient in both software and hardware, it is observed that:

$$R_{\theta'} = \frac{1}{\sqrt{1+\tan^2(\theta')}}\begin{pmatrix} 1 & -\tan(\theta') \\ \tan(\theta') & 1 \end{pmatrix} = \frac{1}{\sqrt{1+\tan^2(\theta')}}P_{\theta'} \qquad (15)$$

Using the discrete basis $w_j = \tan^{-1}(2^{-j})$, it is noted that:

$$v = R_{\theta'}v_0 = R_{\sum_{j=0}^{\infty}d_j w_j}v_0 \qquad (16)$$

$$= \prod_{j=0}^{\infty} R_{d_j w_j} v_0$$

$$= \prod_{j=0}^{\infty} \frac{1}{\sqrt{1+2^{-2j}}} \prod_{j=0}^{\infty} P_{d_j w_j} v_0 = \prod_{j=0}^{\infty} P_{d_j w_j} x_0 = P_{\theta'} x_0$$

where $$x_0 = \left(\frac{1}{K'}, 0\right)^T, K' = \prod_{j=0}^{\infty} \frac{1}{\sqrt{1+2^{-2j}}}.$$

Thus, for a given input value $\theta'$, the following iterative scheme implemented by the CORDIC calculation unit 206 enables both trigonometric functions $\sine(\theta')$ and $\cosine(\theta')$ to be evaluated:

$$\begin{cases} v_k = P_{d_{k-1}w_{k-1}}v_{k-1} \\ v_0 = \left(\frac{1}{K'}, 0\right) \end{cases} \qquad (17)$$

For the particular choice of discrete basis in this example, the matrix $P_{d_{k-1}w_{k-1}}$ is given by:

$$P_{d_{k-1}w_{k-1}} = \begin{pmatrix} 1 & -d_{k-1}2^{-(k-1)} \\ d_{k-1}2^{-(k-1)} & 1 \end{pmatrix} \qquad (18)$$

It can therefore be seen from the above equations how the CORDIC calculation unit can: 1) determine for use at iteration k the value of $d_{k-1}$ (e.g. in accordance with the iterative scheme denoted by equations (12) and (13); and 2) calculate in dependence on the value $d_{k-1}$ and the discrete basis a refined evaluation of the trigonometric functions given by $v_k$ (in this example sine and cosine) using the iterative scheme specified by equations (17) and (18).

Specifically, it can be seen that, if $v_k=(x_k,y_k)$, then the CORDIC calculation unit calculates a refined evaluation of the function $\cos(\theta)$ at iteration k given by:

$$x_k = x_{k-1} - d_{k-1}2^{-(k-1)}y_{k-1} \qquad (19)$$

where $x_k \to \cos(\theta')$ as $k \to \infty$.

Furthermore, it can be seen that the CORDIC calculation unit calculates a refined evaluation of the function $\sin(\theta)$ at iteration k given by:

$$y_k = y_{k-1} + d_{k-1}2^{-(k-1)}x_{k-1} \qquad (20)$$

where $y_k \to \sin(\theta')$ as $k \to \infty$.

It can be seen from equations (19) and (20) that this implementation is particularly advantageous because the non-trivial iterative calculations (when $d_{k-1}=1$) are each reduced to an addition and a multiplication of a previously calculated result by $2^{-(k-1)}$, which can be implemented efficiently by performing a right-shift by k−1 bits.

Thus, the CORDIC calculation unit 206 can implement the above CORDIC algorithm efficiently in either software or hardware.

Figure 5:
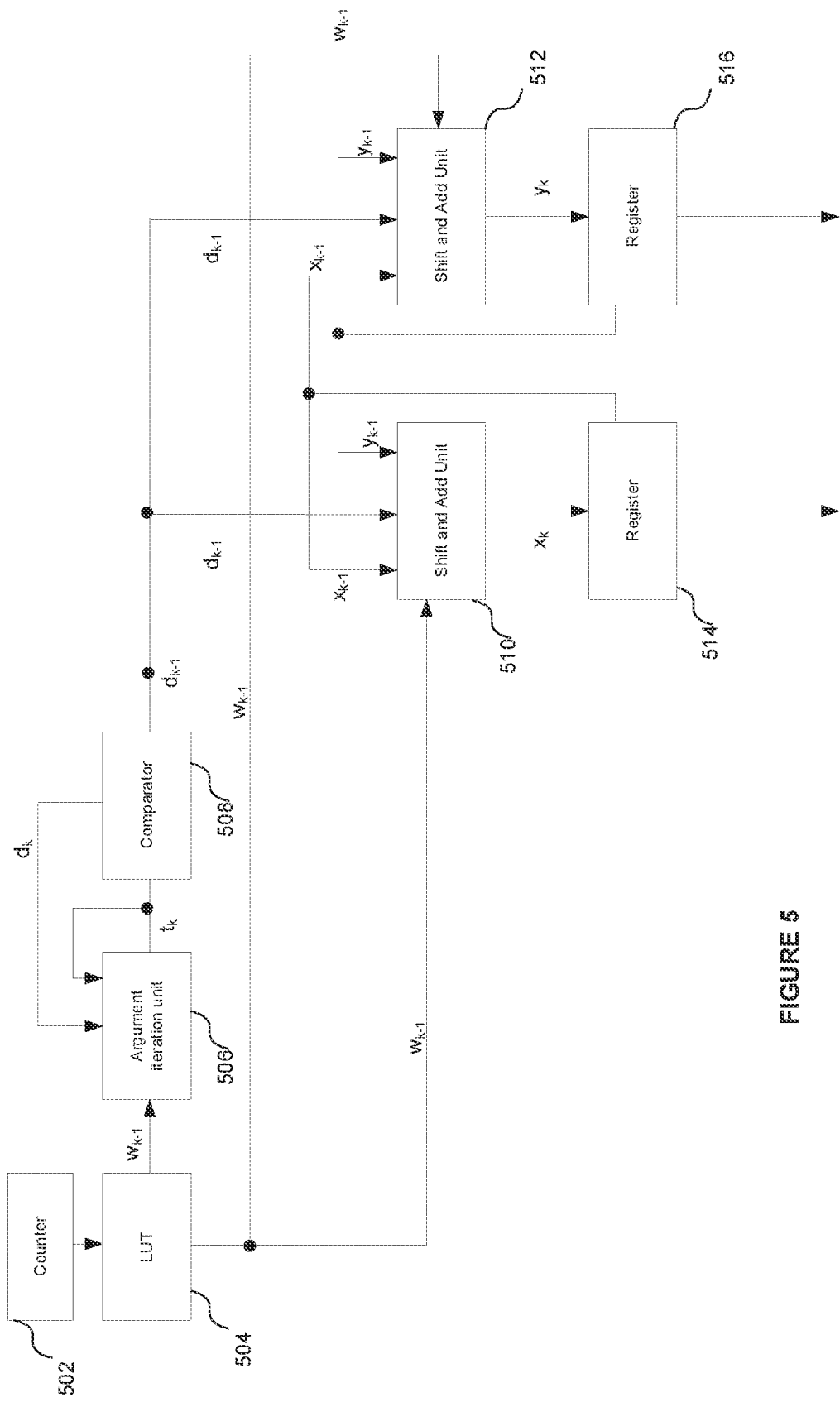
FIG. 5 shows an exemplary implementation of the implementation unit of the CORDIC calculation unit.

FIG. 5 shows an exemplary hardware implementation of the implementing unit 216 for implementing the CORDIC algorithm described above in the form of a logic circuit.

The implementing unit comprises a counter 502; LUT 504; an argument iteration unit 506; a comparator 508; two shift and add units 510 and 512; and two registers 514 and 516.

The operation of the circuit is as follows. Counter 502 maintains a count of the iteration number k being performed by the CORDIC calculation unit. The value 'k' is output to the LUT 504. The LUT stores the set of discrete bases $w_k$. The LUT outputs the constant $w_{k-1}$ for iteration number k into the argument iteration unit 506. The unit 506 has also previously received as inputs $d_{k-1}$ from comparator unit 508 and $t_{k-1}$ output from the unit 506 in the previous iteration k−1 of the algorithm. The unit 506 operates to calculate the value $t_k$ in accordance with equation (12). The output from unit 506 is fed into comparator 508. The value of $t_k$ is also fed back to the argument iteration unit 506 for use in calculating the argument value $t_{k+1}$ in the subsequent $(k+1)^{th}$ iteration.

The comparator 508 compares the value of $t_k$ with the thresholds in accordance with equation (13) in order to calculate the value $d_k$. The value of $d_k$ is fed back to the argument iteration unit 506 for use in calculating the argument value $t_{k+1}$ in the subsequent $(k+1)^{th}$ iteration. The values d (e.g. $d_{k-1}$ in the $k^{th}$ iteration) calculated by the comparator are input into the shift and add units 510 and 512.

For the $k^{th}$ iterative calculation, each of the shift and add units 510 and 512 receive as inputs: $d_{k-1}$ calculated by the comparator unit; $w_{k-1}$ output from the LUT 504; and $x_{k-1}$ and $y_{k-1}$ output from registers 514 and 516 respectively. Each of shift and add units 510 and 512 are configured to perform the iterative calculation specified in equation (19) and (20) respectively in dependence on their inputs. The output of the units 510 and 512 is fed into registers 514 and 516 respectively. Registers 514 and 516 therefore store the most recent evaluation of the trigonometric functions (i.e. the evaluation calculated from the current iterative calculation).

The examples described herein illustrate how a CORDIC calculation unit configured to implement a CORDIC algorithm can be initialised with a first evaluation of a mathematical function $f(x)$ calculated by a polynomial calculation unit. In other words, a CORDIC algorithm is implemented to refine an initial evaluation of a mathematical function determined by evaluating a polynomial $p_i(x)$ that approximates the mathematical function over a domain interval containing the input value of the function, x. By refining the evaluation with a CORDIC algorithm, the size of the stored data that represents the approximating polynomials may be reduced compared to systems in which the final output value of the evaluated function is determined from evaluating an approximating polynomial. This is because the reduced accuracy of the evaluated polynomial that may accompany a reduction in stored data size representing the polynomials can be offset, or negated, by implementing the CORDIC algorithm to refine the evaluations. This in turn can reduce the size of the memory required to store the data values representing the polynomials, thereby potentially improving hardware efficiency.

The size of the stored data representing the polynomials may be reduced by, for example: 1) reducing the number of intervals into which the domain of the function is partitioned; 2) using lower order polynomials to approximate the mathematical function (e.g., quadratic polynomials rather than cubic); and 3) using fewer bits to store each data value (e.g. using fewer bits per control point or per coefficient). The size of the stored data may be reduced by any combination of 1), 2) and 3).

In the examples described herein, a single LUT was used to store the data representing the approximating polynomials. In other examples, the data may be stored in more than one LUT; for example two or more LUTs. In general, the data is stored in one or more LUTs.

The LUT used to store the discrete basis (e.g. as shown in FIG. 5) may be the same LUT used to store the data for the approximating polynomials, or it may be a separate LUT.

Some of the examples herein have been described in the context of a radix-2 implementation. It will be appreciated that the teaching described herein is applicable to different radix types, for example radix 16.

Examples have been described herein with reference to a general mathematical function $f(x)$. It will be appreciated that the argument 'x' could be any suitable variable. It could for example be an angle, $\theta$.

The apparatus of FIGS. 2 and 5 are shown as comprising a number of functional blocks. This is schematic only and is not intended to define a strict division between different logic elements of such entities. Each functional block may be provided in any suitable manner. It is to be understood that intermediate values described herein as being formed by an apparatus need not be physically generated by the apparatus at any point and may merely represent logical values which conveniently describe the processing performed by the apparatus between its input and output.

The apparatuses described herein may be embodied in hardware on an integrated circuit. The apparatuses described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an apparatus configured to perform any of the methods described herein, or to manufacture an apparatus comprising any apparatus described herein. An integrated circuit definition dataset may be, for example, an integrated circuit description.

There may be provided a method of manufacturing, at an integrated circuit manufacturing system, an apparatus as described herein. There may be provided an integrated circuit definition dataset that, when processed in an integrated circuit manufacturing system, causes the method of manufacturing an apparatus to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an apparatus will now be described with respect to FIG. 6.

Figure 6:
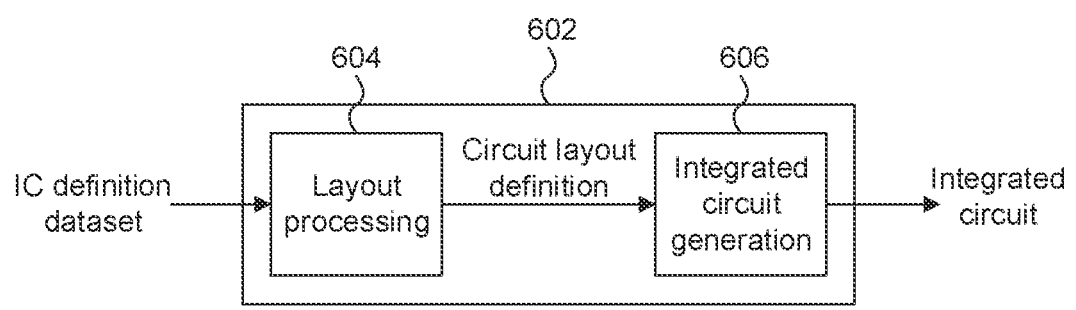
FIG. 6 shows an integrated circuit manufacturing apparatus.

FIG. 6 shows an example of an integrated circuit (IC) manufacturing system 602 which is configured to manufacture an apparatus as described in any of the examples herein. In particular, the IC manufacturing system 602 comprises a layout processing system 604 and an integrated circuit generation system 606. The IC manufacturing system 602 is configured to receive an IC definition dataset (e.g. defining an apparatus as described in any of the examples herein), process the IC definition dataset, and generate an IC according to the IC definition dataset (e.g. which embodies an apparatus as described in any of the examples herein). The processing of the IC definition dataset configures the IC manufacturing system 602 to manufacture an integrated circuit embodying an apparatus as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an apparatus without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. Apparatus configured to evaluate a predetermined mathematical function for a received input value, the apparatus comprising:
    a polynomial hardware block configured to:
        identify a domain interval containing the received input value over which the predetermined mathematical function can be evaluated, the predetermined mathematical function over the identified interval being approximated by a polynomial function; and
        evaluate the polynomial function for the received input value over the identified interval to calculate a first evaluation of the predetermined mathematical function for the received input value; and
    a CORDIC hardware block for performing a CORDIC algorithm, configured to:
        initialise the CORDIC algorithm using the first evaluation of the predetermined mathematical function for the received input value calculated by the polynomial block; and
        implement the CORDIC algorithm to perform a plurality of iterative calculations to calculate a refined evaluation of the predetermined mathematical function for the received input value.

2. Apparatus as claimed in claim 1, wherein the polynomial hardware block and/or the CORDIC hardware block is implemented as fixed logic circuitry.

3. Apparatus as claimed in claim 1, further comprising a memory configured to store values representing a predetermined set of polynomial functions which approximate the predetermined mathematical function over a respective set of domain intervals; wherein values of the polynomial function are stored in the memory.

4. Apparatus as claimed in claim 1, wherein the predetermined mathematical function is approximated over each of a plurality of domain intervals by a respective polynomial function, optionally wherein each of the polynomial functions is represented by a set of one or more stored values.

5. Apparatus as claimed in claim 1, wherein the polynomial function is represented over the identified domain interval by a set of one or more control points, and the hardware polynomial block is configured to evaluate the polynomial function for the received input value using the set of one or more control points.

6. Apparatus as claimed in claim 5, wherein the predetermined mathematical function is approximated over a plurality of domain intervals by a piecewise polynomial function represented by a plurality of stored control points, the predetermined mathematical function being approximated over each interval by a corresponding polynomial function, optionally wherein the piecewise polynomial function is a uniform spline function, and the control points are B-spline control points.

7. Apparatus as claimed in claim 6, wherein the control points are stored in at least one look-up table stored in memory.

8. Apparatus as claimed in claim 7, wherein the at least one look-up table includes a total of M+n entries each storing a single control point, where M is the number of domain intervals over which the predetermined mathematical function is approximated; and n is the order of the polynomial functions approximating the predetermined mathematical function over the intervals.

9. Apparatus as claimed in claim 4, wherein each of the polynomial functions is represented by a respective set of one or more polynomial coefficients.

10. Apparatus as claimed in claim 9, wherein the polynomial coefficients representing the polynomials for the domain intervals are stored in at least one look-up table stored in memory.

11. Apparatus as claimed in claim 10, wherein the at least one look-up table includes a total of M·(n+1) entries each storing a single coefficient, where M is the number of domain intervals over which the predetermined mathematical function is approximated; and n is the order of the polynomial functions approximating the predetermined mathematical function over the intervals.

12. Apparatus as claimed in claim 1, wherein the CORDIC hardware block is configured to implement the CORDIC algorithm by performing a plurality of iterative calculations to calculate the refined evaluation of the predetermined mathematical function $f(x)$ for the received input value x.

13. Apparatus as claimed in claim 12, wherein the CORDIC hardware block is configured to perform each iterative calculation to calculate a refined evaluation to the predetermined mathematical function $f(t_k)$ from a previous evaluation $f(t_{k-1})$, where $t_k = \Sigma_{j=0}^{k} d_j w_j$, $d_j \in D_p$ and $D_p$ is a stored digit set, and $w_j$ are stored constants so that $t_k \to x$ as $k \to \infty$.

14. Apparatus as claimed in claim 13, wherein the CORDIC hardware block is configured to calculate $t_k = t_{k-1} + d_{k-1} w_{k-1}$.

15. Apparatus as claimed in claim 13, wherein the CORDIC hardware block is configured to calculate $t_k = t_{k-1} w_{k-1}^{d_{k-1}}$.

16. Apparatus as claimed in claim 13 wherein the CORDIC hardware block is configured to initialise the CORDIC algorithm with a first evaluation of the predetermined mathematical function $f(t_{k'})$ determined by the polynomial hardware calculation block by evaluating the polynomial function for the received input value x.

17. Apparatus as claimed in claim 12, wherein the CORDIC hardware block is configured to perform the first iterative calculation using the first evaluation of the predetermined mathematical function determined by the polynomial hardware block by evaluating the polynomial function for the received input value.

18. Apparatus as claimed in claim 12, wherein the CORDIC hardware block is configured to implement the CORDIC algorithm until the difference between refined evaluations from successive iterative calculations is less than a specified value.

19. A computer-implemented method of evaluating a predetermined mathematical function for a received input value at an apparatus comprising a polynomial hardware block and a CORDIC hardware block, the method comprising:
   at the polynomial hardware block:
      identifying a domain interval containing the received input value over which the predetermined mathematical function can be evaluated, the predetermined mathematical function over the identified interval being approximated by a polynomial function;
      evaluating the polynomial function for the received input value using values representing the polynomial function over the identified interval to calculate a first evaluation of the predetermined mathematical function for the received input value;
   at the CORDIC hardware block:
      initialising a CORDIC algorithm using the first evaluation of the predetermined mathematical function for the received input value; and
      implementing the CORDIC algorithm to perform a plurality of iterative calculations to calculate a refined evaluation of the predetermined mathematical function for the received input value.

20. A non-transitory computer readable storage medium having stored thereon computer readable instructions that, when executed at a computer system, cause the computer system to perform a method of evaluating a predetermined mathematical function for a received input value, the method comprising:
   identifying a domain interval containing the received input value over which the predetermined mathematical function can be evaluated, the predetermined mathematical function over the identified interval being approximated by a polynomial function;
   evaluating the polynomial function for the received input value using values representing the polynomial function over the identified interval to calculate a first evaluation of the predetermined mathematical function for the received input value;
   initialising a CORDIC algorithm using the first evaluation of the predetermined mathematical function for the received input value; and
   implementing the CORDIC algorithm to perform a plurality of iterative calculations to calculate a refined evaluation of the predetermined mathematical function for the received input value.

* * * * *